(12) United States Patent
Winters

(10) Patent No.: US 6,292,818 B1
(45) Date of Patent: Sep. 18, 2001

(54) METHOD AND APPARATUS FOR PERFORMING A SUM-AND-COMPARE OPERATION

(75) Inventor: Kel D. Winters, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/228,666

(22) Filed: Jan. 12, 1999

(51) Int. Cl.$^7$ .................................. G06F 7/02; G06F 7/50
(52) U.S. Cl. ........................ 708/671; 708/709; 708/710; 340/146.2
(58) Field of Search ........................ 708/671, 708–713; 340/146.2

(56) References Cited

U.S. PATENT DOCUMENTS

| | | | | |
|---|---|---|---|---|
| 4,163,211 | * | 7/1979 | Miura ................................... | 708/713 |
| 5,144,577 | * | 9/1992 | Linnenberg .......................... | 708/671 |
| 5,426,743 | * | 6/1995 | Phillips et al. ...................... | 708/709 |
| 5,923,579 | * | 7/1999 | Widigen et al. ..................... | 708/708 |

* cited by examiner

Primary Examiner—Tan V. Mai

(57) ABSTRACT

A sum-and-compare circuit is provided which minimizes propagation delay and which minimizes the amount of die area required to implement the sum-and-compare circuit. The sum-and-compare circuit comprises a propagate/generate logic block followed by a carry-lookahead tree structure. The propagate/generate logic block receives a first operand, A, a second operand, B, and a third operand, J. The first operand A corresponds to an addend, the second operand B corresponds to an augend, and the third operand J corresponds to the twos compliment of the constant K. The propagate/generate logic block comprises logic configured to add the operand A to the operand B to obtain a first sum and logic configured to add the first sum to the operand J to obtain a plurality of propagate signals and a plurality of generate signals, which are then output from the propagate/generate logic block to a carry-lookahead tree structure. The carry-lookahead tree structure comprises logic configured to operate on the propagate and generate signals to produce an output, Gout. The output Gout can be analyzed to determine whether the equation A+B>=K is true. The output Gout corresponds to the most significant bit of the carry output. If the output Gout is true, then the equation A+B>=K is also true.

20 Claims, 6 Drawing Sheets

METHOD AND APPARATUS FOR PERFORMING A SUM-AND-COMPARE OPERATION

TECHNICAL FIELD OF THE INVENTION

The present invention generally relates to a method and apparatus for performing a sum-and-compare operation and, more particularly, to a high-speed sum-and-compare circuit which mizes propagation delay and which can be implemented in a minimum amount of die area.

BACKGROUND OF THE INVENTION

Rapid detection and prediction of arithmetic overflow and underflow exceptions are crucial to the performance of advanced microprocessors. These operations typically require a comparison of a single operand, A, with a constant, K, such as by the comparison operation A>=K. These operations more frequently involve comparing the sum of two operands, A and B, with a constant, K, such as by the sum-and-compare operation A+B>=K. The speed of this sum-and-compare operation depends on the speed of the carry bit propagation through an n-bit addition, where n is the number of bits of each operand.

The traditional method for performing a sum-and-compare operation, A+B>=K, employs an adder followed by a subtractor. FIG. 1 is a block diagram functionally illustrating the sum-and-compare circuit for performing this operation. The adder circuit 1 obtains the sum of the operands A and B and outputs the sum to a second adder circuit 2. The adder circuit 2 functions as the subtractor and adds the twos complement, J, of the constant K to the sum output from the adder circuit 1. The most significant carry output bit, Cout, is true if the condition A+B>=K is true.

The performance of the sum-and-compare circuit shown in FIG. 1 is limited by the propagation or "rippling" of carry bits from the least significant bit of the result to the most significant bit of the result. Several adder architectures have been developed for accelerating carry propagation to reduce the propagation delay, such as carry-lookahead architectures, carry-skip architectures and carry-select architectures. These adder architectures are well known in the art and their characteristics are summarized in the following table in terms of propagation delay and area complexity.

| Type | Delay | Area |
| --- | --- | --- |
| Ripple | D(n) | A(n) |
| Carry Lookahead | D(log n) | A(n log n) |
| Carry Skip | D(sqrt n) | A(n) |
| Carry Select | D(sqrt n) | A(n) |

In the table shown above, the letter D represents the intrinc delay, the letter A represents the die area required for logic needed for one bit of the operation, and the letter n is the number of bits of the adder, commonly referred to as the adder width. As the table indicates, with all of these adder architectures, delay and die area increase as the number of bits of the adder increases. The fastest of these architectures, and the most costly in terms of die area, is the carry-lookahead adder architecture.

A traditional carry-lookahead circuit 5 is shown in FIG. 2. The traditional carry-lookahead circuit 5 has the form of a binary tree comprised of "generate" and "propagate" signals and cells 7, which operate on the generate and propagate signals. The term "binary tree" is used to describe this circuit due to the fact that the number of outputs of each cell 7 is equal to the number of inputs to the cell divided by two. For comparitor applications, it is sufficient to compute only the most significant "generate" output. It is unnecessary to provide additional circuity for low order sum outputs.

The P and G inputs, $P_0$ and $G_0$ through $P_7$ and $G_7$, are the propagate and generate values, respectively, previously calculated from addends A and B in accordance with the following equations:

$$P = A \text{ OR } B \qquad \text{Equation (1)}$$

$$G = AB \qquad \text{Equation (2)}$$

In the interest of brevity, the circuitry for performing these operations is not show. Each cell 7 in the carry-lookahead circuit 5 executes the operations given by the following equations:

$$G_{out} = G_i \text{ OR } P_i G_{i-1} \qquad \text{Equation (3)}$$

$$P_{out} = P_i P_{i-1} \qquad \text{Equation (4)}$$

Optimal performance in a CMOS implementation of a sum-and-compare circuit requires that the gate-level granularity of the cells be appropriate to the process technology being used to implement the sum-and-compare circuit. If the gates are too complex, then nonlinear delays associated with the series field effect transistors (FETs) comprising the gates will dominate the critical ting paths. Also, increased complexity of the gates increases die area. On the other hand, if the gates are too simple, then intrinsic inverter delays will dominate the critical timing paths. Therefore, in order to maximize performance of the sum-and-compare circuit without increasing the amount of die area needed to implement the circuit, all of these factors should be taken into consideration.

Accordingly, a need exists for a sum-and-compare circuit which implements logic gates with a gate-level granularity appropriate to the process used to design and fabricate the sum-and-compare circuit, and which balances series FET delays with intrinsic inverter delays so that the propagation delay of the sum-and-compare circuit is minimized.

SUMMARY OF THE INVENTION

The present invention provides a sum-and-compare circuit which minimizes propagation delay and which minimizes the amount of die area required to implement the sum-and-compare circuit. The sum-and-compare circuit comprises a propagate/generate block followed by a carry-lookahead tree structure. The propagate/generate logic block receives a first operand, A, a second operand, B, and a third operand, J. each of the operands is comprised of a plurality of bits. The first operand A corresponds to an addend, the second operand B corresponds to an augend, and the third operand J corresponds to the twos complement of the constant K. The propagate/generate logic block comprises logic configured to add the operand A to the operand B to obtain a first sum. The propagate/generate logic block comprises logic configured to add the first sum to the operand J to obtain a plurality of propagate signals and a plurality of generate signals, which are then output from the propagate/generate logic block to a carry-lookahead tree structure.

The carry-lookahead tree structure comprises logic configured to operate on the propagate and generate signals to produce an output, Gout. The output Gout can be analyzed to determine whether the equation A+B>=K is true. The output Gout corresponds to the most significant bit of the carry output. If the output Gout is true, then the equation A+B>=K is also true.

The carry-lookahead tree structure preferably is partitioned into dynamic logic gates of a gate-level granularity appropriate to the process by which the carry-lookahead tree structure is fabricated, which preferably is a deep submicron CMOS process. The sum-and-compare circuit is designed in such a way that the series FET delays are balanced with the intrinsic inverter delays so that the propagation delay of the sum-and-compare circuit is minimized while also minimizing the amount of die area needed to implement the sum-and-compare circuit.

The sum-and-compare circuit of the present invention is faster and requires less die area than typical sum-and-compare circuits, which normally utilize separate adders with binary carry-lookahead tree structures to perform the sum-and-compare operation. Also, the sum-and-compare circuit of the present invention is well suited to implementation in deep submicron processes, which are capable of producing logic gates with fine gate-level granularity. Preferably, the sum-and-compare circuit of the present invention is implemented using dynamic domino logic with minimal gate loading.

Other features and advantages of the present invention will become apparent from the following description, drawings and claims.

DETAILED DESCRIPTION OF THE INVENTION

Figure 1:
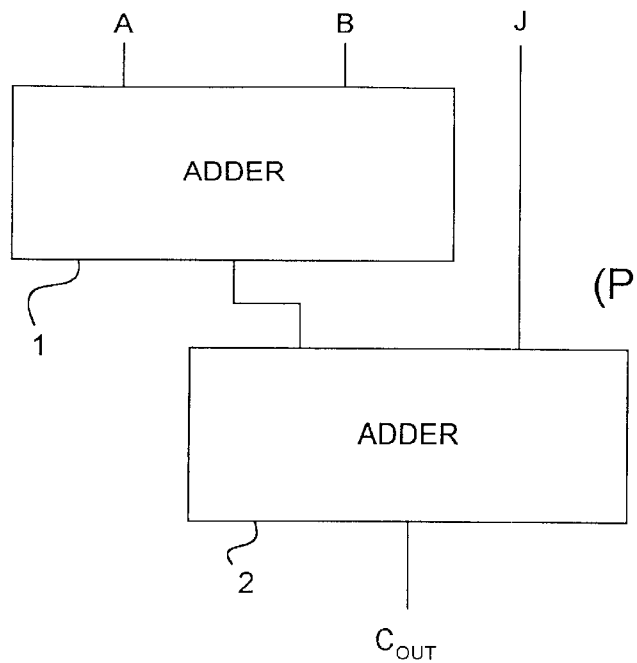
FIG. 1 is a block diagram of a typical sum-and-compare circuit used for obtaining a sum of two operands and for comparing the sum to a constant.
Figure 2:
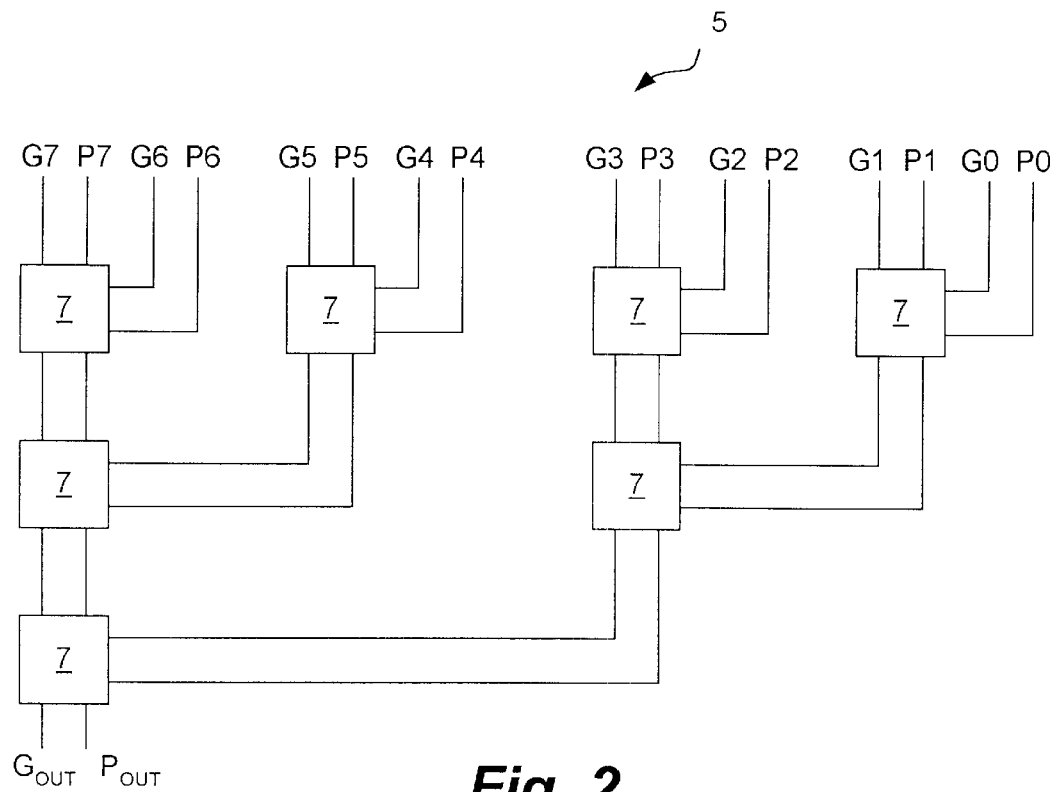
FIG. 2 is a block diagram of a typical carry-lookahead adder having a binary tree structure.
Figure 3:
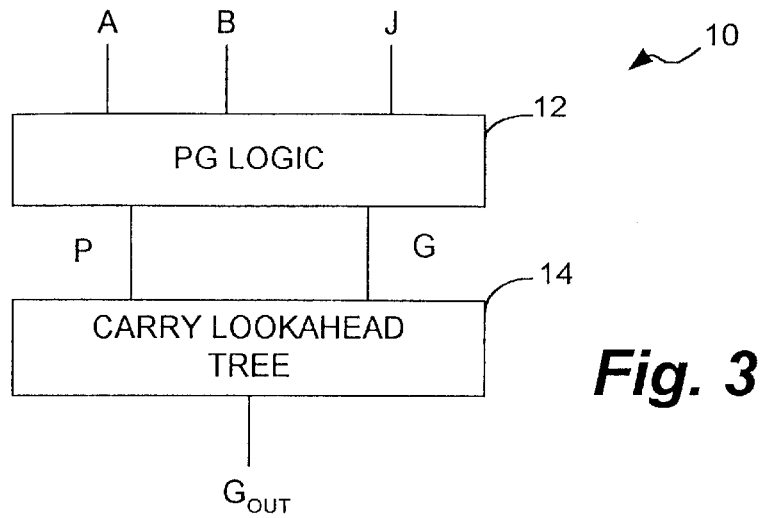
FIG. 3 is a block diagram of the sum-and-compare circuit of the present invention

FIG. 3 is a block diagram of the sum-and-compare circuit 10 of the present invention. The sum-and-compare circuit 10 comprises a propagate/generate logic block 12 followed by a carry-lookahead tree structure 14 of appropriate gate-level granularity for the process being used to design and fabricate it, which preferably is a deep submicron CMOS process.

The operands A, B and J are each comprised of a particular number, n, of bits. The number of bits, n, depends on the width of the sum-and-compare circuit. For example, if the width of the sum-and-compare circuit is eight, each of the operands win be comprised of eight bits. For each bit i of operands A, B and J, where i is a number between 0 and n−1, each logic cell (not shown) comprised by the propagate/generate logic block 12 executes the function:

$$P_i = (A_i \text{ XOR } B_i \text{ XOR } J_i) \text{ OR } (A_{i-1}B_{i-1} \text{ OR } A_{i-1}J_{i-1} \text{ OR } B_{i-1}J_{i-1})$$   Equation (5)

$$G_i = (A_i \text{ XOR } B_i \text{ XOR } J_i) \text{ AND } (A_{i-1}B_{i-1} \text{ OR } A_{i-1}J_{i-1} \text{ OR } B_{i-1}J_{i-1})$$   Equation (6)

As stated above, preferably the sum-and-compare circuit 10 of the present invention is implemented in dynamic domino logic, which is well known to those skilled in the art. Dynamic domino logic circuits utilize a precharged dynamic stage followed by a static inverter stage. The logic functions $(A_i \text{ XOR } B_i \text{ XOR } J_i)$ and $(A_{i-1}B_{i-1} \text{ OR } A_{i-1}J_{i-1} \text{ OR } B_{i-1}J_{i-1})$ in Equations (5) and (6) preferably are implemented as precharged dynamic logic gates, while the final AND or OR stages of the propagate/generate logic block 12 are implemented as static CMOS logic gates. The combination of the precharged and static logic gates completes the dynamic domino logic circuit. A detailed discussion of these precharged and static logic gates of the propagate/generate logic block 12 is provided below with reference to the schematic diagram of FIG. 6.

When the propagate and generate signals P and G are received by the carry-lookahead tree structure 14 they are operated on by the logic cells (not shown) of the carry-lookahead tree structure 14 to produce $G_{out}$, which is the most significant bit of the carry output. If the condition A+B>=K is true, $G_{out}$ will also be true.

Figure 4:
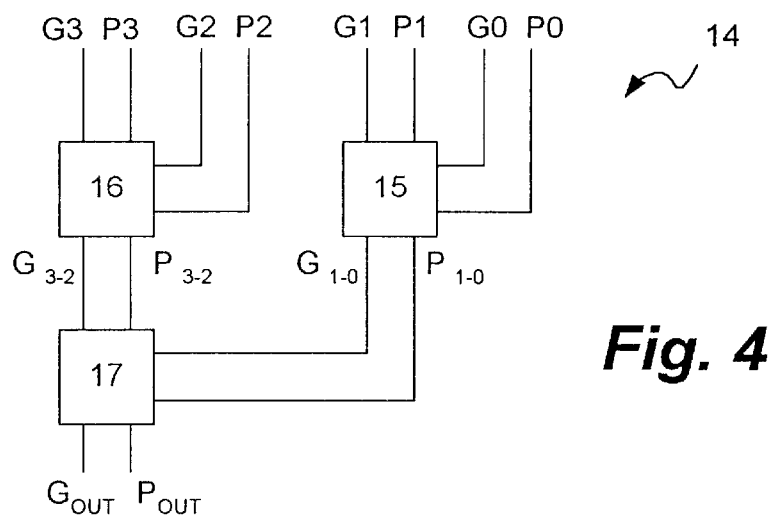
FIG. 4 is a detailed block diagram of a first embodiment of the carry-lookahead tree structure comprised in the sum-and-compare circuit shown in FIG. 3.

FIG. 4 is a detailed block diagram of a first embodiment of the carry-lookahead tree structure 14 shown in FIG. 3. In accordance with this embodiment, the carry-lookahead tree structure 14 comprises three blocks 15, 16 and 17 which together form a single dynamic domino cell which processes three pairs of propagate and generate signals. The carry-lookahead tree structure 14 executes the following Boolean functions corresponding to the generate and propagate logic:

$$\text{GoutG}_3 \text{ OR } P_3(G_2 \text{ OR } P_2(G_1 \text{ OR } P_1 G_0))$$   Equation (7)

$$\text{Pout} = P_3 P_2 P_1$$   Equation (8)

In accordance with the preferred embodiment of the present invention, blocks 15 and 16 are implemented as dynamic precharged logic gates and block 17 is implemented as a static CMOS gate, thus completing the dynamic domino logic circuit. In accordance with the preferred embodiment of the present invention, this configuration utilizes only three series N metal oxide semiconductor (NMOS) FETs in the precharged logic blocks 15 and 16 to provide the critical timing path to ground. This configuration preferably utilizes only two series P metal oxide semiconductor (PMOS) FETs in the static CMOS stage 17 to pull the output of the static stages up to VDD.

By minimizing the number of series NMOS FETs implemented in the portion of the critical timing path corresponding to the discharge path and by minimizing the number of series PMOS FETs implemented in the portion of the critical timing path used to pull the output of the static stages up to VDD, the speed of the carry lookahead tree structure 14 is optimized. However, it will be understood by those skilled in the art that more than three NMOS and two PMOS FETs can be implemented in the critical timing path, but that doing so may tend to decrease the processing speed of the carry lookahead tree structure 14. It should also be noted that this optimum configuration also minimizes the amount of die area required for implementation of the carry-lookahead tree structure 14. A detailed discussion of the carry-lookahead tree structure 14 of FIG. 4 will be provided below with respect to FIG. 7.

Figure 5:
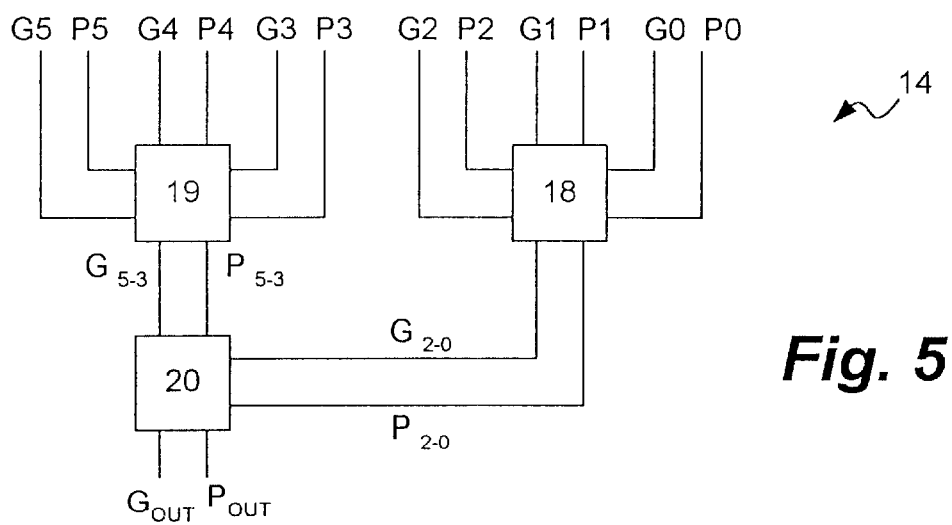
FIG. 5 is a detailed block diagram of a second embodiment of the carry-lookahead tree structure comprised in the sum-and-compare circuit shown in FIG. 3.

FIG. 5 is a detailed block diagram of a second embodiment of the carry-lookahead tree structure 14 shown in FIG. 3. In accordance with this embodiment, the carry-lookahead tree structure 14 comprises three blocks 18, 19 and 20, which together form a single dynamic domino cell which processes six pairs of propagate and generate signals. Blocks 18 and 19 preferably are implemented in dynamic precharged logic and block 20 preferably is a static CMOS gate, thus completing the dynamic domino logic circuit. The carry-lookahead tree structure 14, in accordance with this embodiment, executes the following functions corresponding to the generate and propagate logic:

Gout=$G_5$ OR $P_5(G_4$ OR $P_4(G_3$ OR $P_3(G_2$ or $P_2(G_1$ OR $P_1G_0)))$   Equation (9)

Pout=$P_0$ AND $P_1$ AND $P_2$ AND $P_3$ AND $P_4$ AND $P_5$   Equation (10)

As with the embodiment described above with respect to FIG. 4, in the embodiment of FIG. 5, only two series PMOS FETs and three series NMOS FETs are implemented in the critical timing path. However, in the case of the six-input circuit of FIG. 5, the number of series NMOS FETs required in the critical timing path is limited to three by eliminating a clocked pulldown or "evaluation" FET (not show) from the dynamic precharged logic circuit. Such unclocked dynamic circuits (i.e., dynamic circuits which do not implement the evaluation FET) are known in the industry and require that special constraints be met in implementing them, which are well known to those skilled in the art. Generally, unclocked domino circuits must be preceded by clocked domino circuits which evaluate during the same clock phase. Also, the precharge signal to an unclocked domino circuit must be delayed from the clock of the previous clocked domino circuit to prevent the occurrence of a short-circuit or "crowbar" path from the power supply to ground at the start of the precharge phase. Those skilled in the art will understand the manner in which these constraints may be met.

Figure 6:
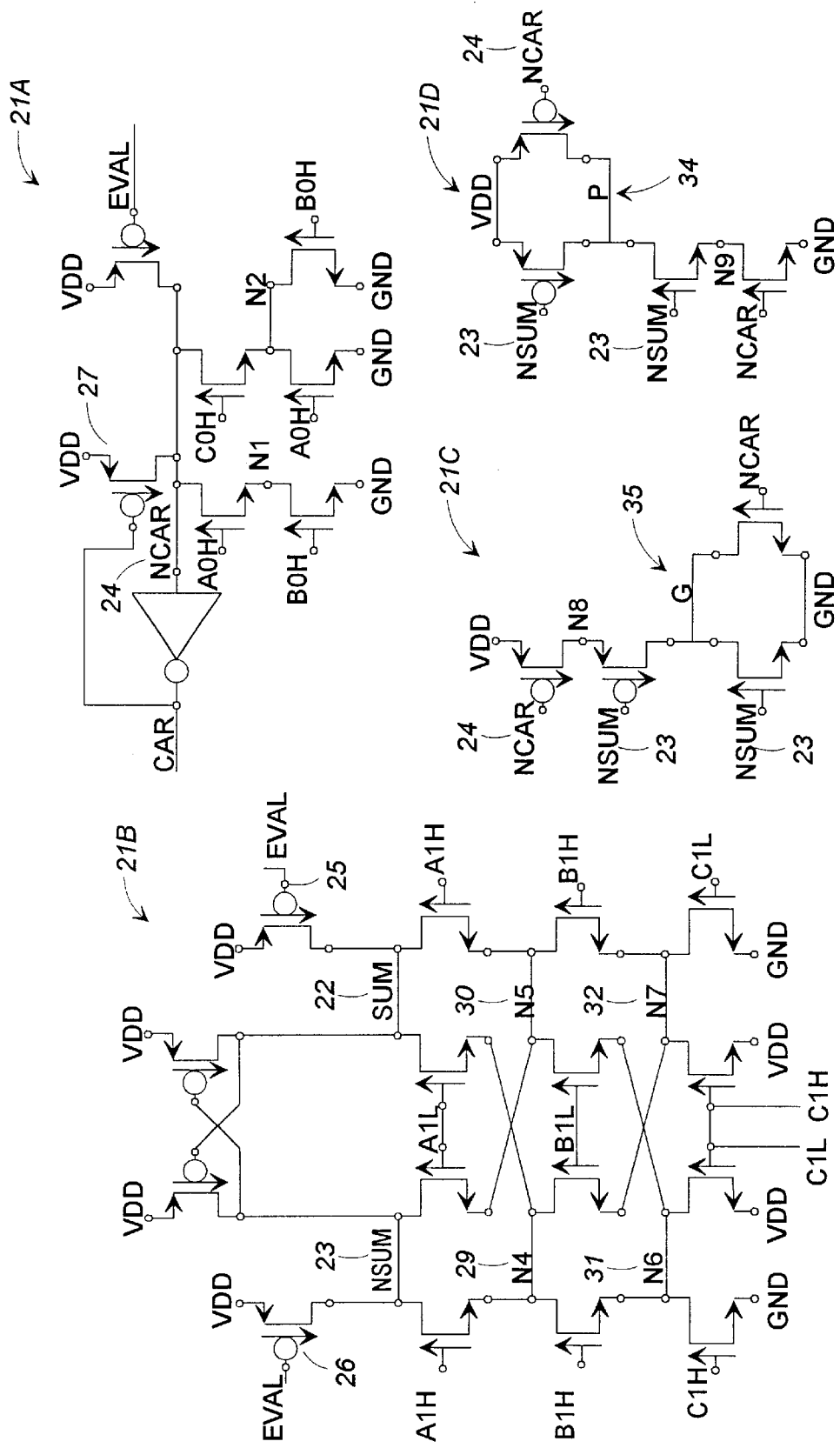
FIG. 6 is a schematic diagram of the propagate/generate logic block shown in FIG. 3.

FIG. 6 illustrates a schematic diagram of the propagate/generate logic block 12 shown in FIG. 3. The gates of the FETs having the bubble on them are PMOS FETs and the gates of the FETs without the bubbles are NMOS FETs. The circuit shown in FIG. 6 utilizes only the propagate and generate signals corresponding to bits 0 through 3 of the augend and the addend, ie., it is a four-bit propagate/generate circuit. However, those skilled in the art will understand the manner in which the circuit shown in FIG. 6 could be duplicated to produce a propagate/generate circuit for use in sum-and-compare circuits having a larger number of bits (e.g., eight, sixteen, thirty two, etc.).

The circuit 12 comprises a dynamic logic gate comprised of circuits 21A and 21B and generate and propagate static output gates comprised of circuits 21C and 21D, respectively. The output signal G 35 is produced by static output gate 21C and the output signal P 34 is produced by static output gate 21D. Nodes identified in FIG. 6 with identical reference numbers are coupled together. The combination of these dynamic and static logic gates forms a dynamic domino logic circuit, as mentioned above with respect to FIG. 3.

When the clock signal EVAL, is low, the dynamic precharged nodes 22, 23 and 24 are charged high by PMOS FETs 25, 26 and 27. To prevent failures due to charge sharing, interstitial pulldown nodes 29, 30, 31 and 32 in the dynamic stages are also precharged high. During this period, outputs P and G, 34 and 35, respectively, are always driven low. When the clock signal, EVAL, is high, the dynamic precharged nodes 22, 23 and 24 evaluate to their valid state, either retaining their charge or discharging depending on whether the inputs A1, B1 and C1 to the NMOS pulldown FET network comprised of the NMOS FETs in gates 21A and 21B provide a path to ground (GND) from the dynamic precharged nodes 22, 23 and 24. To prevent failures due to sub-threshold leakage, weak PMOS FETs, commonly referred to as "keeper FETs", maintain the high state of the dynamic precharged nodes 22, 23 and 24 when they are not being discharged. The static CMOS output gates 21C and 21D drive the output signals G and P, respectively, to their valid states at this time. The G and P output signals are then utilized by the carry lookahead tree structure 14 to complete the sum-and-compare operation.

Figure 7:
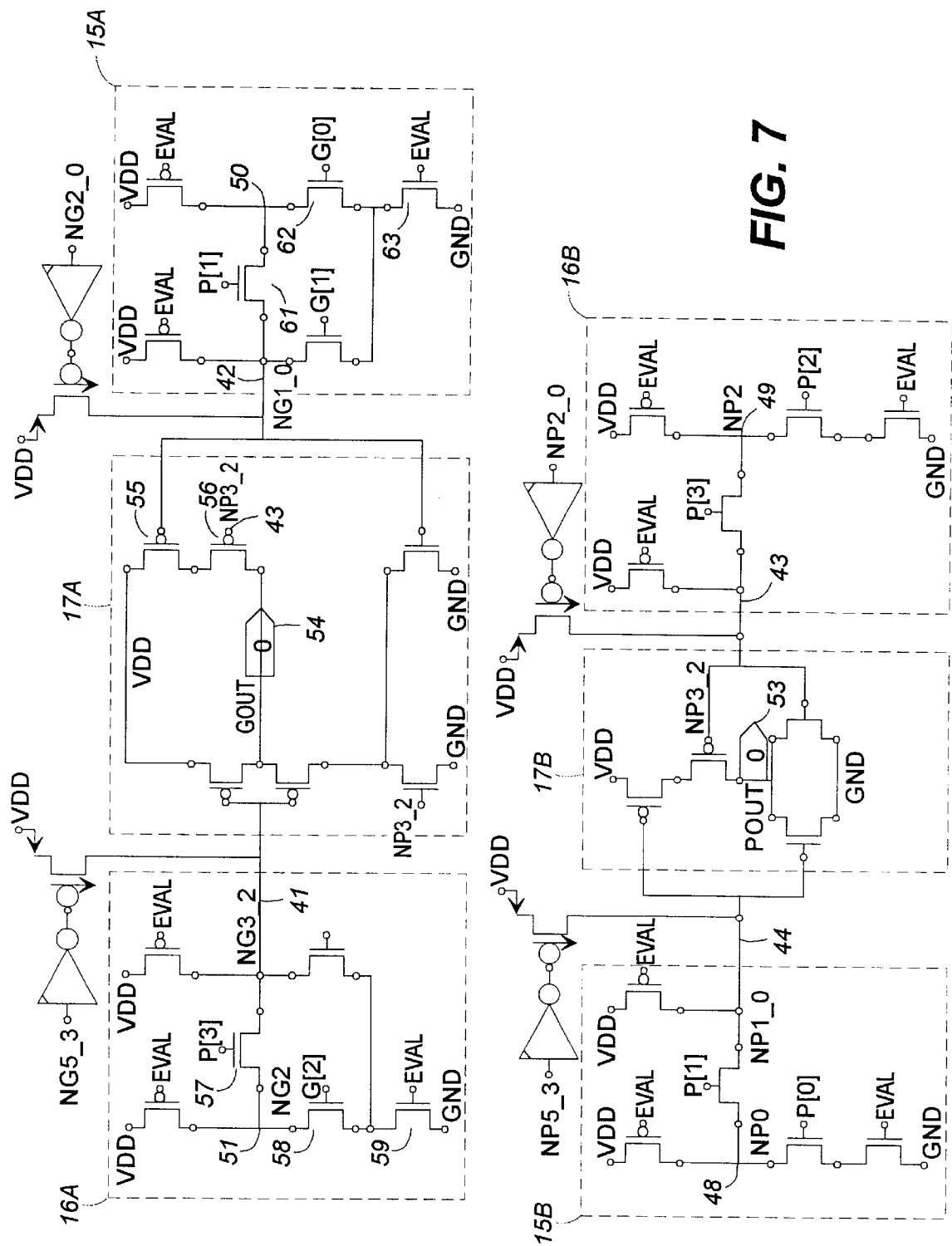
FIG. 7 is a schematic diagram of the carry-lookahead tree structure shown in FIG. 4.

A schematic diagram of a first embodiment of the carry-lookahead tree structure 14 of FIG. 4 is shown in FIG. 7. The circuit shown in FIG. 7 is intended to be utilized in a four-bit sum-and-compare circuit and therefore utilizes four pairs of propagate and generate signals corresponding to bits 0 through 3. However, those skilled in the art will understand the manner in which the circuit shown in FIG. 7 could be duplicated to produce carry-lookahead tree structures for use in sum-and-compare circuits having a larger number of bits (e.g., eight, sixteen, thirty two, etc.).

The gates enclosed by dashed boxes 15A and 15B are comprised in block 15 shown in FIG. 4. The gates enclosed by dashed boxes 16A and 16B are comprised in block 16 shown in FIG. 4. The gates enclosed by dashed boxes 17A and 17B are comprised in block 17 shown in FIG. 4. The gates enclosed by dashed boxes 15A, 16A and 17A correspond to the generate logic of the carry lookahead tree structure 14. The gates enclosed by dashed boxes 15B, 16B and 17B correspond to the propagate logic of the carry lookahead tree structure 14. The gates enclosed by dashed boxes 15A, 15B, 16A and 16B are dynamic logic gates and the output gates enclosed by dashed boxes 17A and 17B are static gates. This combination of static and dynamic logic forms a dynamic domino logic circuit.

As stated above with respect to FIG. 4, only two PMOS FETs 55 and 56 are used in the critical timing path to pull the output, Gout, up to the supply voltage VDD. Also, only three NMOS FETs 57, 58 and 59 are used in the critical timing path in the logic gate contained in dashed box 16A to provide the discharge path from the precharged node 41 to ground (GND). Similarly, only three NMOS FETs 61, 62 and 63 are used in the critical timing path in the logic gate contained in dashed box 15A to provide the discharge path from the precharged node 42 to ground (GND). The NMOS FETs 59 and 63 which have their gates connected to the clock, EVAL, ensure that the charges on the precharged nodes 41 and 42 will not be discharged to ground unless the clock signal is high, regardless of the values of the inputs to the NMOS FET network. This is also the case with the propagate logic contained in dashed boxes 15B, 16B and 17B.

As stated above, by limiting the number of NMOS FETs in the critical timing path to three and by liming the number of series PMOS FETs in the critical timing path to two, the speed of the carry lookahead tree structure is optimized. However, it will be understood by those skilled in the art that the present invention is not limited to this particular number of NMOS and PMOS FETs. Those skilled in the art will understand that this logic configuration is preferred since it optimized performance, but that other logic configurations can be used as well.

The operation of the dynamic domino logic circuit of FIG. 7 will now be discussed. When the clock signal, EVAL, is low, the dynamic precharged nodes 41, 42, 43 and 44 are charged high. To prevent failures due to charge sharing, the interstitial pulldown nodes 48, 49, 50 and 51 in the dynamic stages 15A, 15B, 16A and 16B are also precharged high. Outputs Gout and Pout in boxes 17A and 17B, respectively, are always driven low at this time. When the clock signal, EVAL, is high, the dynamic precharged nodes 41, 42, 43 and 44 evaluate to their valid state, either retaining their charge or discharging it depending on whether the inputs P[0], P[1], P[2], P[3], G[0], G[1], G[2] and G[3] to the NMOS pull-down FET network provide a path to ground (GND). The static CMOS output gates in boxes 17A and 17B drive Pout and Gout, which are labeled with reference numerals 53 and 54, respectively, to their valid states at this time.

Figure 8A:
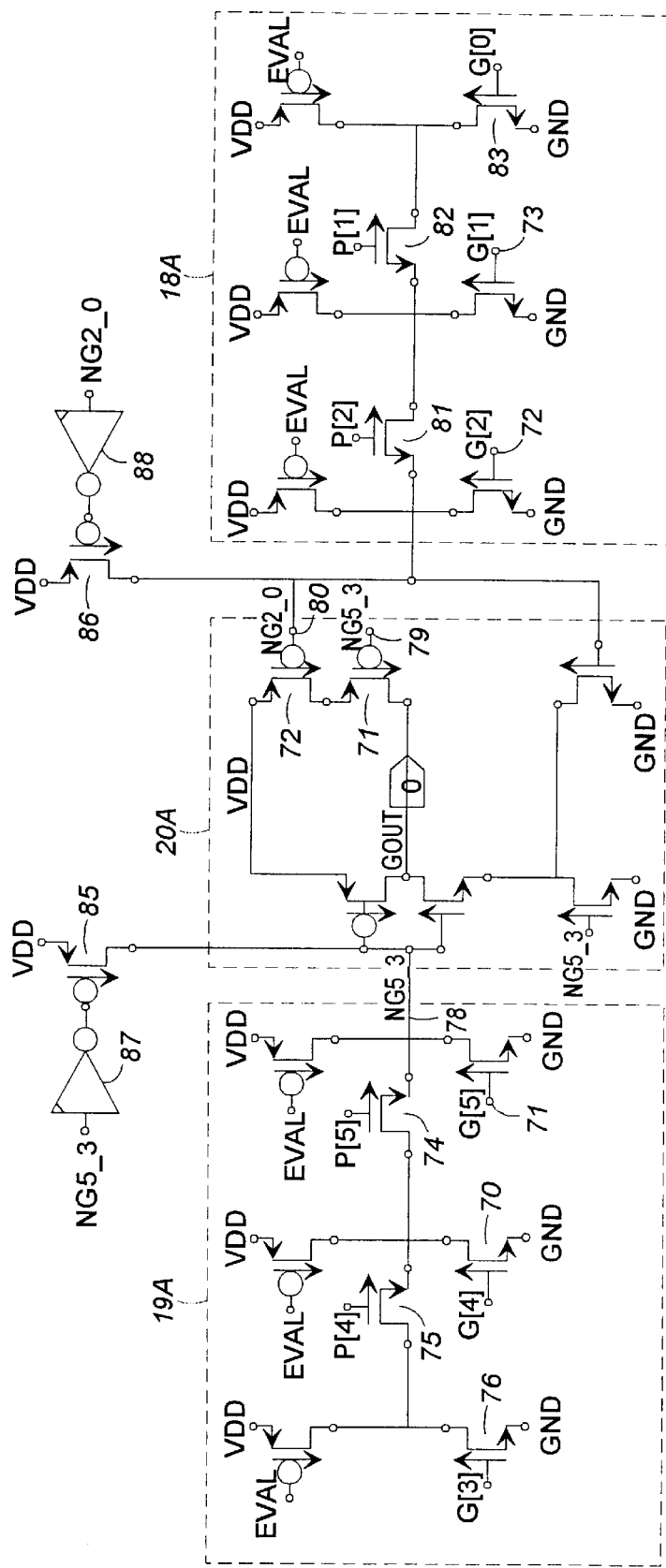
FIGS. 8A and 8B are schematic diagrams of the carry-lookahead tree structure shown FIG. 5.
Figure 8B:
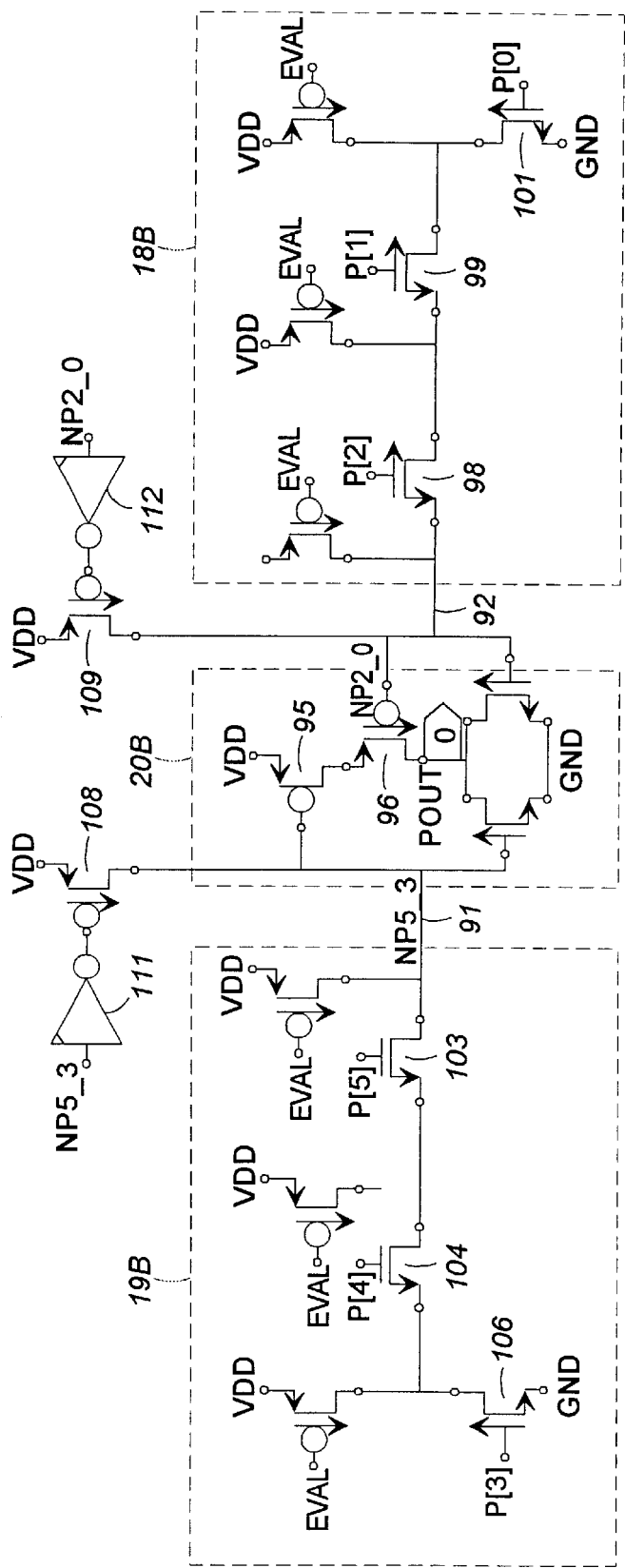

A schematic diagram of a second embodiment of the carry-lookahead tree structure 14 of FIG. 5 is shown in FIGS. 8A and 8B. The functionality of the carry lookahead tree structure shown in FIGS. 8A and 8B is very similar to the functionality of the carry lookahead tree structure shown in FIG. 7. However, in contrast to the four-bit circuit shown in FIG. 7, the circuit shown in FIGS. 8A and 8B utilizes six pairs of propagate and generate signals corresponding to bits 0 through 5. Those skilled in the art will understand the manner in which the circuit shown in FIGS. 8A and 8B could be duplicated to produce carry-lookahead tree structures for use in sum-and-compare circuits having a larger number of bits (e.g., eight, sixteen, thut two, etc.).

The Boolean functions for the generate and propagate logic of the circuit shown in FIGS. 8A and 8B, respectively, are expressed above in Equations (9) and (10), respectively. The generate logic of the carry lookahead tree structure is shown in FIG. 8A and is contained in the dashed boxes 18A, 19A and 20A. The propagate logic of the carry lookahead tree structure is shown in FIG. 8B and is contained in the dashed boxes 18B, 19B and 20B. Since the propagate logic comprised in boxes 18B, 19B and 20B of FIG. 8B operates essentially in a manner identical to the manner in which the generate logic comprised in boxes 18A, 19A and 20A of FIG. 8A operates, only the operations of the generate logic of FIG. 8A will be described herein in the interest of brevity. Also, it should be noted that only the output of the generate logic, Gout, is needed for the sum-and-compare operation. Therefore, the propagate logic is illustrated primarily for purposes of providing a complete description of the carry lookahead tree structure in accordance with this embodiment.

The dashed boxes 18A and 18B in FIGS. 8A and 8B are comprised in block 18 in FIG. 5. Dashed boxes 19A and 19B in FIGS. 8A and 8B are comprised in block 19 in FIG. 5. Dashed boxes 20A and 20B in FIGS. 8A and 8B are comprised in block 20 in FIG. 5. In accordance with the preferred embodiment of the present invention, only two series PMOS FETs 71 and 72 are implemented in the critical timing path to pull the output Gout up to the supply voltage VDD. Only three NMOS FETs are implemented in the critical timing path to discharge the precharged nodes 78, 79 and 80 to ground (GND). In dashed box 19A, these NMOS FETs are labeled with reference numerals 74, 75 and 76. In dashed box 18A, these NMOS FETs are labeled with reference numerals 81, 82 and 83. By minimizing the number of series NMOS FETs in the critical timing path to ground, and by minimizing the number of series PMOS FETs used to pull the output Gout up to VDD, the speed of the carry lookahead tree structure is optimized.

In the six-bit carry lookahead tree structure shown in FIG. 8A, the number of series NMOS FETs in the critical timing path was reduced to three by eliminating the clocked NMOS FETs (e.g., 59 and 63 in FIG. 7) controlling the discharge paths to ground. The clocked NMOS FETs connected to ground can be eliminated provided that the unclocked circuit, ie., a circuit which does not utilize the clocked NMOS FETs, is preceded by a clocked circuit, such as that shown in FIG. 7. In accordance with the preferred embodiment of the present invention, an unclocked carry lookahead tree structure, such as that shown in FIG. 8A, is preceded by a clocked carry lookahead tree structure, such as that shown in FIG. 7. This allows the number of NMOS FETs in the critical paths in each of the carry lookahead tree structures to be limited to three.

The precharged nodes 78, 79 and 80 are precharged by keeper FETs 85 and 86, which are connected at their gates to inverters 87 and 88, respectively. The keeper FETs 85 and 86 prevent the charges on nodes 78, 79 and 80 from bleeding away, ie., from losing their charges. Thus, the keeper FETs 85 and 86 maintain the charges on the precharged nodes until the inputs P[0]–P[5] and G[0]–G[5] of the NMOS FETs 70–76 and 81–83 cause the precharged nodes 78, 79 and 80 from being discharged to ground.

As stated above, the operations of the propagate logic circuit comprised in dashed boxes 18B, 19B and 20B in FIG. 8B is essentially identical to the operations of the generate logic contained in dashed boxes 18A, 19A and 20A in FIG. 8A discussed above in detail. Therefore, in the interest of brevity, a detailed discussion of the operations of the propagate logic will not be provided herein. However, it should be noted that the propagate logic also implements only three series NMOS FETs 98, 99 and 101 or 103, 104 and 106 in the critical timing path to provide the discharge path to ground. Also, the static gate comprised in the dashed box 20B only utilizes two series PMOS FETs to pull the output Pout up to VDD. As stated above, the sum-and-compare operation of the present invention only utilizes the output of the generate logic, Gout, of the carry lookahead tree structure. Therefore, it will be understood by those skilled in the art that the propagate logic is not critical to the present invention.

It should be noted that the present invention has been described with respect to the preferred embodiments and that the present invention is not limited to these embodiments. Those skilled in the art will understand that the modifications may be made to the embodiments discussed above which are within the scope of the present invention.

What is claimed is:

1. An apparatus for performing a sum-and-compare operation to determine whether an equation A+B>=K is true, where A is a first operand, B is a second operand, and K is a constant, the apparatus comprising:

a propagate/generate logic block which receives the first operand, A, comprised of a plurality of bits, the second operand, B, comprised of a plurality of bits and a third operand, J, comprised of a plurality of bits, the first operand A corresponding to an addend, the second operand B corresponding to an augend, the third operand J corresponding to a twos compliment of the constant K, the propagate/generate logic block comprising logic configured to add the operand A to the operand B to obtain a first sum, the propagate/generate logic block comprising logic configured to add the first sum to the operand J to obtain a plurality of propagate signals and a plurality of generate signals, the propagate and generate signals being output from the propagate/generate logic block; and a carry-lookahead tree structure which receives the propagate and generate signals output from the propagate/generate logic block, the carry-lookahead tree structure comprising logic configured to operate on the propagate and generate signals to produce an output, Gout, wherein the output, Gout, can be analyzed to determine whether the equation A+B>=K is true.

2. The apparatus of claim 1, wherein the carry-lookahead tree structure is implemented using dynamic domino logic.

3. The apparatus of claim 2, wherein the propagate/generate logic block comprises logic configured to execute a first Boolean logic function $P_i=(A_i \text{ XOR } B_i \text{ XOR } J_i)$ OR $(A_{i-1}B_{i-1}$ OR $A_{i-1}J_{i-1}$ OR $B_{i-1}J_{i-1})$ to obtain the propagate signals, and wherein the propagate/generate logic block comprises logic configured to execute a second Boolean logic function $G_i=(A_i \text{ XOR } B_i \text{ XOR } J_i)$ AND $(A_{i-1}B_{i-1}$ OR $A_{i-1}J_{i-1}$ OR $B_{i-1}J_{i-1})$ to obtain the generate signals, where i corresponds to a particular bit of operands A, B and J, i being a number between 0 and n−1, where n corresponds to the total number of bits comprising either of the operands A or B.

4. The apparatus of claim 3, wherein the logic functions $(A_i \text{ XOR } B_i \text{ XOR } J_i)$ and $(A_{i-1}B_{i-1}$ OR $A_{i-1}J_{i-1}$ OR $B_{i-1}J_{i-1})$ of said first and second logic functions are implemented using precharged dynamic logic gates.

5. The apparatus of claim 4, wherein the carry-lookahead tree structure obtains the output, Gout, by executing a third Boolean logic function Gout=$G_i$ OR $P_i(G_{i-1}$ OR $P_{i-1}(G_{i-2}$ OR $P_{i-2}G_{i-3}))$.

6. The apparatus of claim 5, wherein the third Boolean logic function is implemented as a dynamic domino logic circuit.

7. The apparatus of claim 6, wherein the dynamic domino logic circuit of the carry-lookahead tree structure comprises a plurality of precharged logic gates and at least one static complementary metal oxide semiconductor (CMOS) output gate, each of said precharged logic gates comprising a plurality of field effect transistors, the field effect transistors of a particular precharged logic gate providing a plurality of paths which connect a precharged node of the particular precharged logic gate to ground, wherein one of the paths in each of the precharged logic gates corresponds to a critical timing path.

8. The apparatus of claim 7, wherein the critical timing path in each precharged logic gate consists of three field effect transistors connected in series between the precharged node and ground.

9. The apparatus of claim 8, wherein the static complimentary metal oxide semiconductor (CMOS) output gate comprises two series field effect transistors which couple the output, Gout, to a supply voltage, VDD.

10. An apparatus for performing a sum-and-compare operation to determine whether an equation A+B>=K is true, where A is a first operand, B is a second operand, and K is a constant, the apparatus comprising:

a first means which receives the first operand, A, which is comprised of a plurality of bits, the second operand, B, which is comprised of a plurality of bits and a third operand, J, which is comprised of a plurality of bits, the first operand corresponding to an addend, the second operand corresponding to an augend, the third operand J corresponding to a twos compliment of a constant K, the first means adding the operand A to the operand B to obtain a first sum, the first means adding the first sum to the operand J to obtain a plurality of propagate signals and a plurality of generate signals, the propagate and generate signals being output from the first means;

a second means which receives the propagate and generate signals output from the first means, the second means operating on the propagate and generate signals to produce an output, Gout, wherein the output, Gout, can be analyzed to determine whether the equation A+B>=K is true.

11. The apparatus of claim 10, wherein the first means executes a first Boolean logic function $P_i=(A_i \text{ XOR } B_i \text{ XOR } J_i)$ OR $(A_{i-1}B_{i-1}$ OR $A_{i-1}J_{i-1}$ OR $B_{i-1}J_{i-1})$ to obtain the propagate signals, and wherein the first means executes a second Boolean logic function $G_i=(A_i \text{ XOR } B_i \text{ XOR } J_i)$ AND $(A_{i-1}B_{i-1}$ OR $A_{i-1}J_{i-1}$ OR $B_{i-1}J_{i-1})$ to obtain the generate signals, where i corresponds to a particular bit of operands A, B and J and is a number between 0 and n−1, where n corresponds to the total number of bits comprising either of the operands A or B.

12. The apparatus of claim 11, wherein the second means executes a third Boolean logic function Gout=$G_i$ OR $P_i(G_{i-1}$ OR $P_{i-1}(G_{i-2}$ OR $P_{i-2}G_{i-3}))$ to obtain the output Gout.

13. A method for performing a sum-and-compare operation to determine whether an equation A+B>=K is true, where A is a first operand, B is a second operand, and K is a constant, the method comprising the steps of:

obtaining the first operand, A, the second operand, B, and a third operand, J, each of the operands being comprised of a plurality of bits, the first operand A corresponding to an addend, the second operand B corresponding to an augend, the third operand J corresponding to a twos compliment of the constant K;

adding the operand A to the operand B to obtain a first sum;

adding the first sum to the operand J to obtain a plurality of propagate signals and a plurality of generate signals;

operating on the propagate and generate signals in a carry lookahead tree structure to produce an output, Gout, wherein the output, Gout, can be analyzed to determine whether the equation A+B>=K is true.

14. The method of claim 13, wherein said step of adding the operand A to the operand B and said step of adding the first sum to the operand J are performed by executing a first Boolean logic function $P_i=(A_i \text{ XOR } B_i \text{ XOR } J_i)$ OR $(A_{i-1}B_{i-1}$ OR $A_{i-1}J_{i-1}$ OR $B_{i-1}J_{i-1})$ to obtain the propagate signals, and by executing a second Boolean logic function $G_i=(A_i \text{ XOR } B_i \text{ XOR } J_i)$ AND $(A_{i-1}B_{i-1}$ OR $A_{i-1}J_{i-1}$ OR $B_{i-1}J_{i-1})$ to obtain the generate signals, where i corresponds to a particular bit of operands A, B and J, i being a number between 0 and n−1, where n corresponds to the total number of bits comprising either of the operands A or B.

15. The method of claim 14, wherein the logic functions $(A_i \text{ XOR } B_i \text{ XOR } J_i)$ and $(A_{i-1}B_{i-1}$ OR $A_{i-1}J_{i-1}$ OR $B_{i-1}J_{i-1})$ of said first and second logic functions are implemented using precharged dynamic logic gates.

16. The method of claim 15, wherein said step of operating on the propagate and generate signals to obtain the output Gout is performed by executing a third Boolean logic function Gout=$G_i$ OR $P_i$($G_{i-1}$ OR $P_{i-1}$($G_{i-2}$ OR $P_{i-2}G_{i-3}$)).

17. The method of claim 16, wherein the third Boolean logic function is implemented as a dynamic domino logic circuit in the carry lookahead tree structure.

18. The method of claim 17, wherein the dynamic domino logic circuit of the carry-lookahead tree structure comprises a plurality of precharged logic gates and at least one static complementary metal oxide semiconductor (CMOS) output gate, each of said precharged logic gates comprising a plurality of field effect transistors, the field effect transistors of a particular precharged logic gate providing a plurality of paths which connect a precharged node of the particular precharged logic gate to ground, wherein one of the paths in each of the precharged logic gates corresponds to a critical timing path.

19. The method of claim 18, wherein the critical timing path in each precharged logic gate consists of three field effect transistors connected in series between the precharged node and ground.

20. The method of claim 19, wherein the static complimentary metal oxide semiconductor (CMOS) output gate comprises two series field effect transistors which couple the output, Gout, to a supply voltage, VDD.

* * * * *